(12) United States Patent
Ling

(10) Patent No.: US 9,008,571 B2
(45) Date of Patent: Apr. 14, 2015

(54) METHOD AND SYSTEM FOR A SINGLE FREQUENCY NETWORK FOR BROADCASTING TO MOBILE DEVICES

(75) Inventor: Curtis Ling, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 303 days.

(21) Appl. No.: 13/591,768

(22) Filed: Aug. 22, 2012

(65) Prior Publication Data

US 2014/0057549 A1 Feb. 27, 2014

(51) Int. Cl.
*H04H 20/74* (2008.01)
*H04H 20/02* (2008.01)
*H04H 20/67* (2008.01)
*H04H 60/23* (2008.01)

(52) U.S. Cl.
CPC ............. *H04H 20/67* (2013.01); *H04H 20/02* (2013.01); *H04H 20/74* (2013.01); *H04H 60/23* (2013.01)

(58) Field of Classification Search
USPC ...................................... 455/3.06, 3.02, 12.1
See application file for complete search history.

(56) References Cited

U.S. PATENT DOCUMENTS

| | | | |
|---|---|---|---|
| 2002/0059614 A1* | 5/2002 | Lipsanen et al. ................ | 725/75 |
| 2002/0154055 A1 | 10/2002 | Davis et al. | |
| 2006/0262222 A1 | 11/2006 | Monnier et al. | |
| 2008/0060024 A1 | 3/2008 | Decanne | |
| 2009/0007189 A1 | 1/2009 | Gutknecht et al. | |
| 2009/0113492 A1 | 4/2009 | Norin et al. | |
| 2009/0274089 A1* | 11/2009 | Money et al. ................ | 370/316 |
| 2011/0207472 A1* | 8/2011 | Abraham et al. .......... | 455/456.1 |

FOREIGN PATENT DOCUMENTS

| | | |
|---|---|---|
| EP | 1494353 A3 | 1/2006 |
| WO | 2009143082 A1 | 11/2009 |
| WO | 2011033342 A1 | 3/2011 |

OTHER PUBLICATIONS

European Search Report for EP 12003194 dated Aug. 24, 2012.

* cited by examiner

*Primary Examiner* — Tu X Nguyen
(74) *Attorney, Agent, or Firm* — McAndrews, Held & Malloy, Ltd.

(57) ABSTRACT

One or more circuits of a satellite reception assembly may be operable to receive a satellite signal, recover content carried in the satellite signal, and broadcast a signal carrying the content for reception by one or more mobile devices. The satellite reception assembly may be mounted to the residence of a satellite subscriber. The signal carrying the content may be frequency locked to a reference signal that is available to the satellite reception assembly and to one or more other satellite reception assemblies. The reference signal may be a GNSS signal. The one or more circuits may communicate with the one or more mobile devices to provide a key to the one or more mobile devices, where the key is required for descrambling and/or decryption of the content carried in said signal.

7 Claims, 10 Drawing Sheets

_US 9,008,571 B2_

METHOD AND SYSTEM FOR A SINGLE FREQUENCY NETWORK FOR BROADCASTING TO MOBILE DEVICES

INCORPORATION BY REFERENCE

This patent application makes reference to:
U.S. provisional patent application Ser. No. 61/620,720 entitled "Method and System for Full Spectrum Capture (FSC) for Terrestrial Applications" and filed on Apr. 5, 2012;
U.S. provisional patent application Ser. No. 61/595,654 entitled "Method and System for an Internet Protocol LNB (IP LNB)" and filed on Feb. 6, 2012;
U.S. patent application Ser. No. 13/326,125 entitled "System and Method in a Broadband Receiver for Efficiently Receiving and Processing Signals" and filed on Dec. 14, 20122;
U.S. patent application Ser. No. 13/316,796 entitled "System and Method for Conditional Access in an In-Home Network Based on Multi-Network Communication" and filed on Dec. 12, 2011;
U.S. patent application Ser. No. 13/546,704 entitled "Method and System for Multi-Service Reception" and filed on Jul. 11, 2012;
U.S. patent application Ser. No. 13/585,930 entitled "Method and Apparatus for Content Protection and Billing for Mobile Delivery of Satellite Content" and filed on Aug. 15, 2012; and
United States patent application Ser. No. 13/591,826 entitled "Method and System for Caching Content for Mobile Distribution" filed on Aug. 22, 2012.

Each of the applications listed above is hereby incorporated herein by reference in its entirety.

TECHNICAL FIELD

Aspects of the present application relate to electronic communications. More specifically, to a method and system for a single frequency network for broadcasting to mobile devices.

BACKGROUND

Existing methods and systems for delivering terrestrial and/or satellite broadcast content to mobile devices can be inefficient. Further limitations and disadvantages of conventional and traditional approaches will become apparent to one of skill in the art, through comparison of such approaches with some aspects of the present method and system set forth in the remainder of this disclosure with reference to the drawings.

BRIEF SUMMARY

A method and/or system is provided for a single frequency network for broadcasting to mobile devices, substantially as illustrated by and/or described in connection with at least one of the figures, as set forth more completely in the claims.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "module" refers to functions than can be performed by one or more circuits. As utilized herein, the term "exemplary" means serving as a non-limiting example, instance, or illustration. As utilized herein, the terms "e.g.," and "for example" introduce a list of one or more non-limiting examples, instances, or illustrations.

Figure 1A:
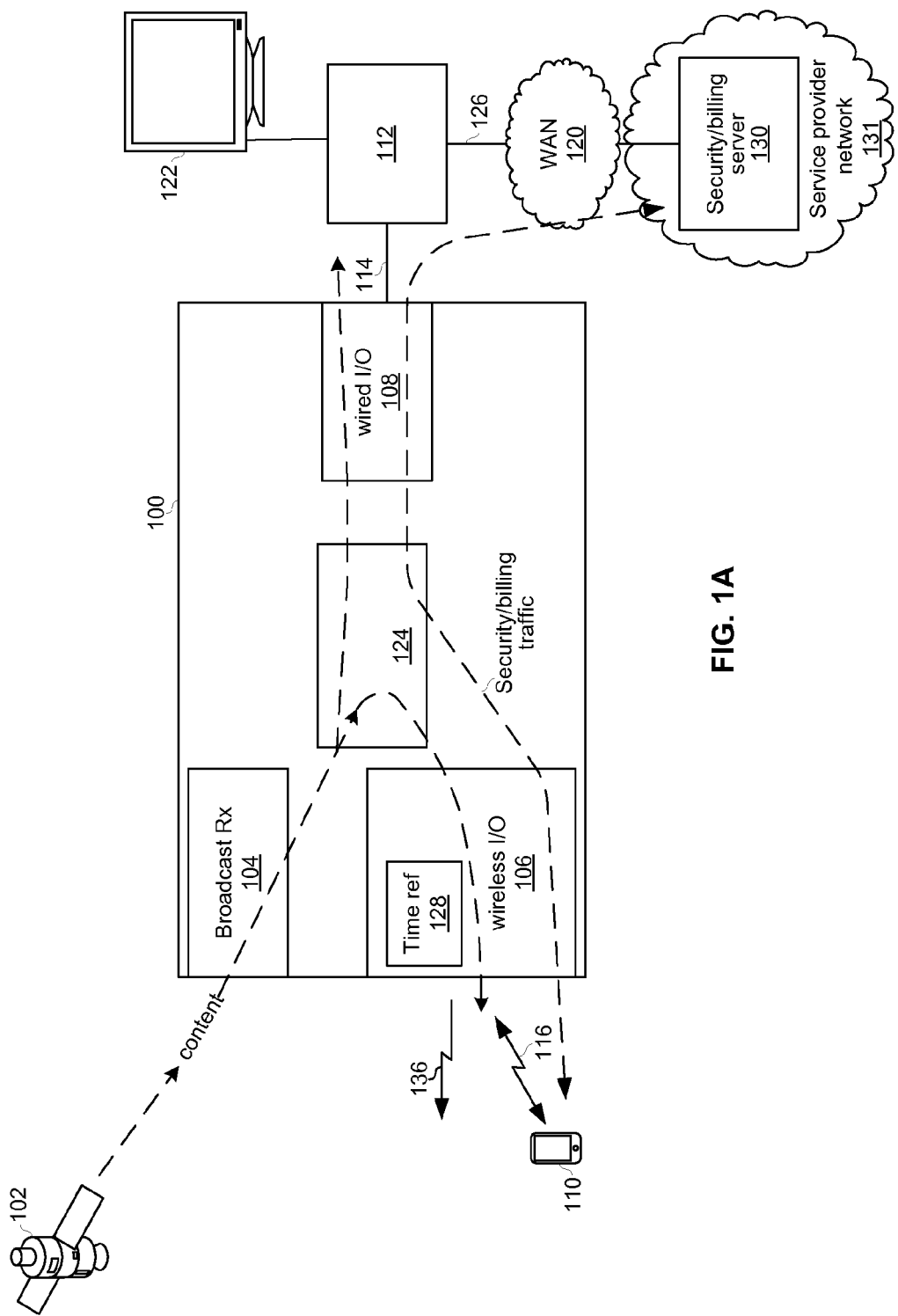
FIGS. 1A and 1B depict a system that is operable to broadcast data to mobile devices.
Figure 1B:
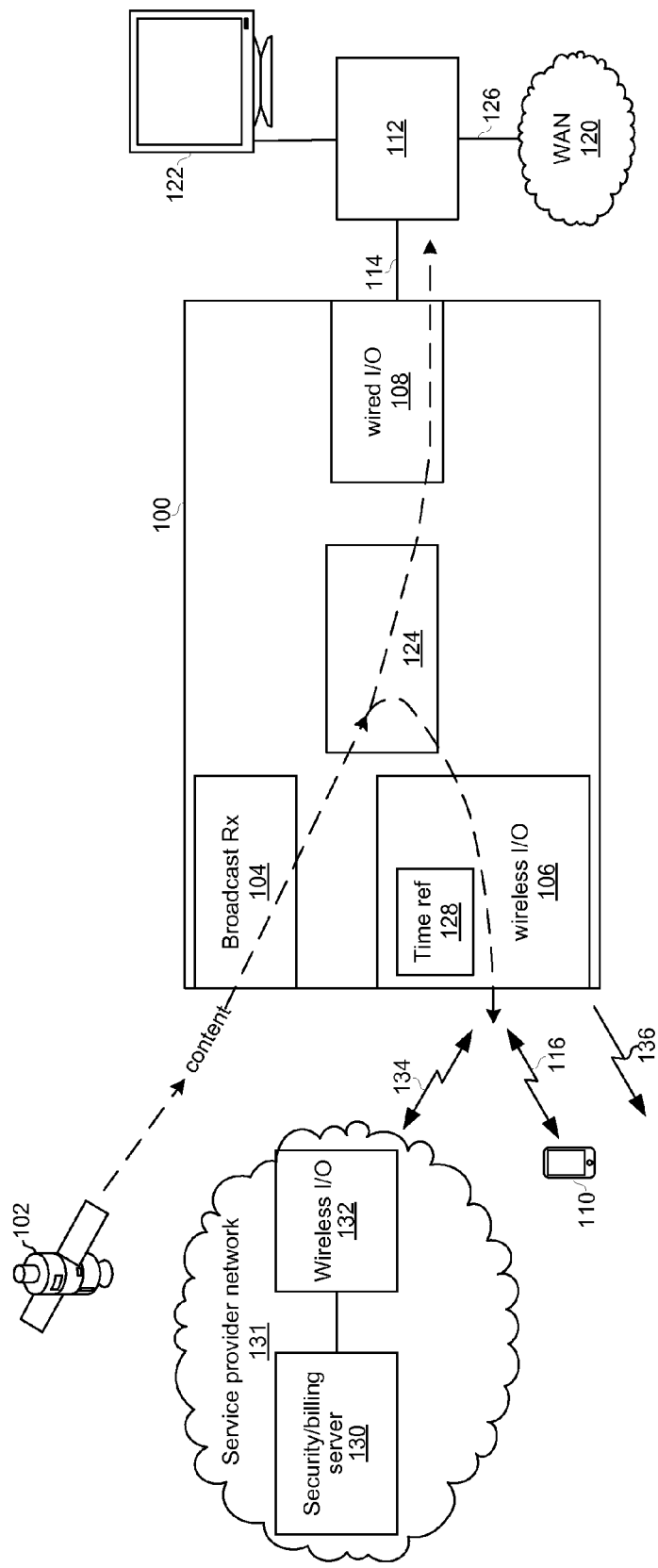

FIGS. 1A and 1B depict a system that is operable to broadcast data to mobile devices. Referring to FIG. 1A, the system 100 comprises a broadcast receive module 104, a wireless input/output (I/O) module 106, a wired I/O module 108, and a routing module 124. Also shown are a service provider network 131, a mobile device 110, a module 112, a client device 122, and a wide area network (WAN) 120.

The satellite 102 may broadcast data (e.g., media content) in accordance with a broadcast standard such as, for example, DVB-S. In an example implementation, some of the bandwidth of the satellite 102 may be utilized for transmitting mobile-formatted content. For example, the content of one or more television networks may be concurrently broadcast in a first format (e.g., high-definition, low-compression ratio video and surround-sound audio) a second format (e.g., standard definition, high-compression ration video and stereo audio). The first format may be encrypted and/or scrambled utilizing a first content protection scheme (e.g., a first set of security algorithms and/or a first set of keys and/or certificates) and the second format may be encrypted and/or scrambled utilizing a second content protection scheme (e.g., a first set of security algorithms and/or a first set of keys and/or certificates). For example, content protected with the first scheme may be recoverable only by devices (e.g., gateways) that have built-in hardware-based conditional access systems (CAS), whereas content protected with the second scheme may be recoverable utilizing keys obtained through two-way exchanges.

The network 131 represents the network(s) of one or more service providers. For example, the network 131 may comprise a network of a cellular service provider, a network of a satellite service provider, and/or a network of a billing service provider that performs billing functions for other service providers. The security and/or billing server 130 may manage billing accounts for subscribers of one or more service providers. For example, the server 130 may maintain a database of users and/or mobile devices which are subscribed to content that is broadcast by the satellite 102 and delivered in a unicast and/or multicast manner via the WAN 120, and may track consumption of the content by those users/devices. This information may be provided to a satellite service provider so that the satellite provider can bill the users/devices for the content. Similarly, the server 130 may maintain a database of users and/or mobile devices which are subscribed to wireless (e.g., cellular) services associated with the wireless module 106 and may track usage of the module 106's bandwidth. This information may be provided to a cellular service provider so that the cellular provider can bill the users/devices for the bandwidth usage.

Additionally or alternatively, the security and/or billing server 130 may manage certificates, keys, and/or other security information for accessing content broadcast by the satellite 102 and/or delivered to the system 100 via the WAN 120 and broadband connection 126. For example, the server 130 may maintain a database of content currently being transmitted to the system 100 and keys and/or other security information associated with that content. In the example implementation shown in FIG. 1A, the system 100 communicates with the server 130 via the WAN 120. In the implementation shown in FIG. 1B, on the other hand, the server 130 is reachable wirelessly, via wireless I/O module 132, such that the system 100 can communicate with the server 130 via a connection 134 without use of the WAN 120 or broadband connection 126.

The mobile device 110 may be operable to communicate wirelessly in accordance with one or more wireless communication protocols. For example, the device 110 may be a cellular handset operable to communicate in accordance with cellular (e.g., LTE) and/or IEEE 802.11 protocols. An example implementation of the mobile device 110 is described below with reference to FIG. 6.

Figure 2:
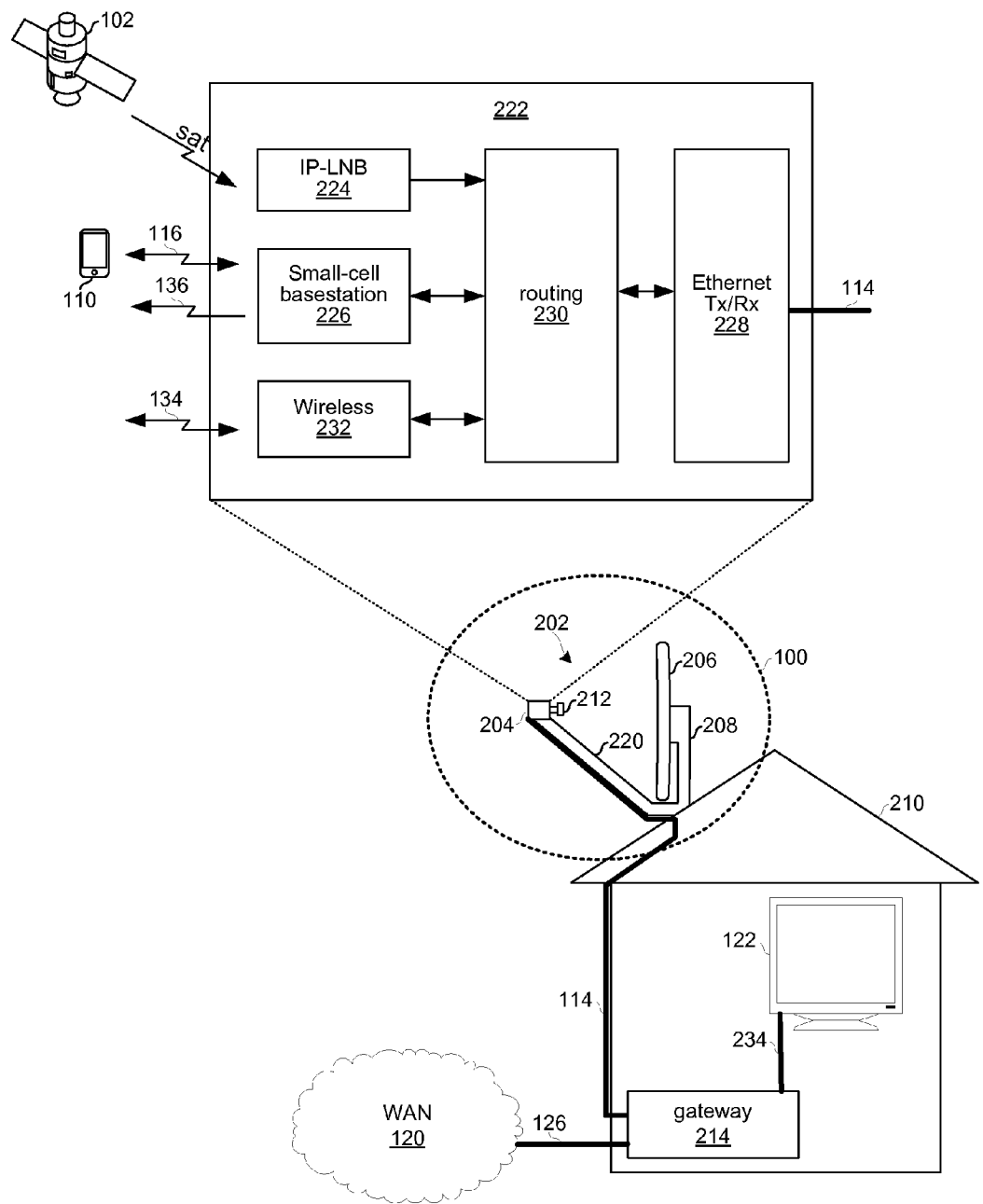
FIG. 2 depicts an example implementation of the system of FIG. 1 in which the system comprises a small-cell base station.
Figure 3:
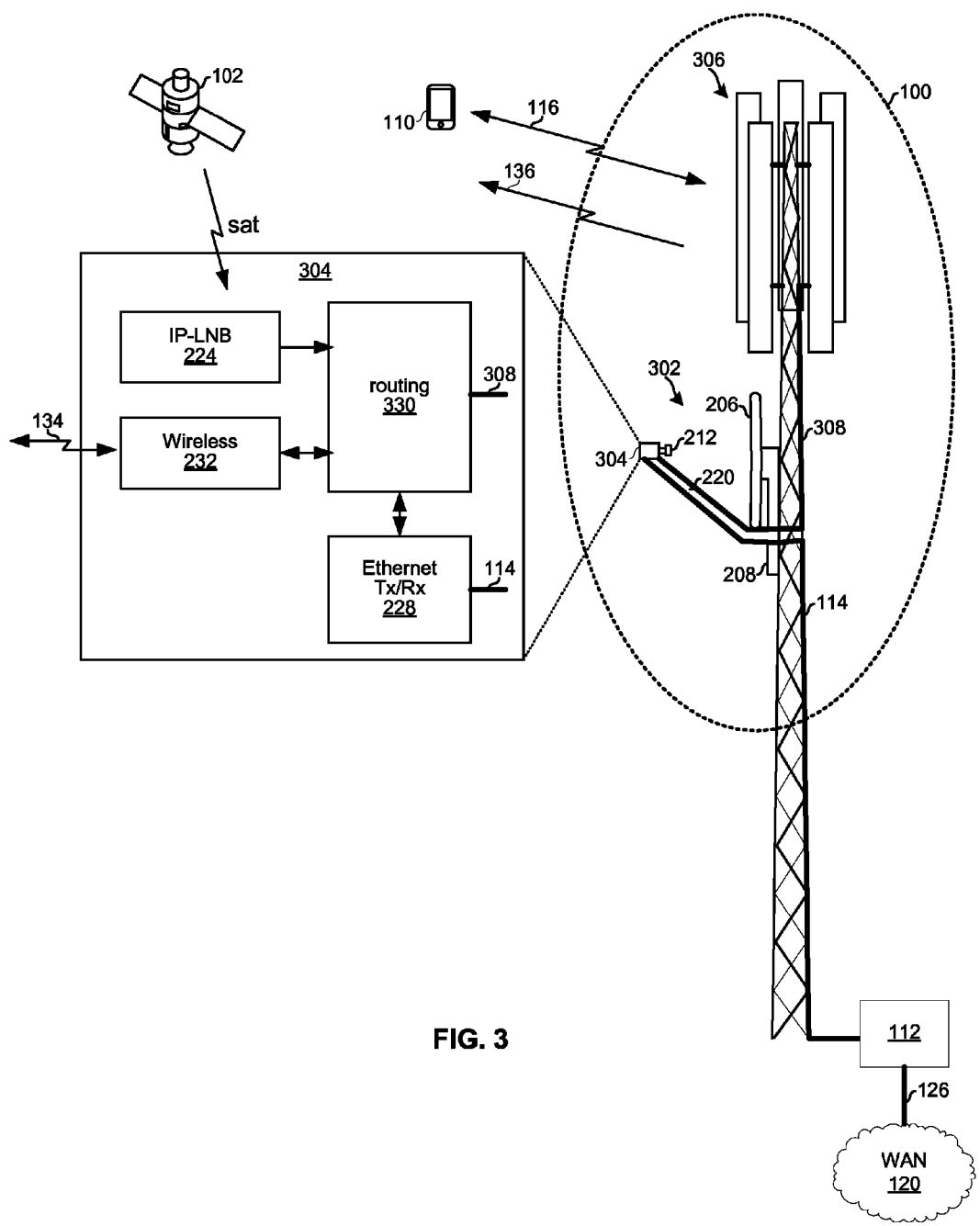
FIG. 3 depicts an example implementation of the system of FIG. 1 in which the system comprises a macrocell basestation.

The various components of the system 100 and the module 112 may be collocated on, for example, a cellular tower as shown in FIG. 3 or a satellite subscriber premises (e.g., a house, multi-dwelling unit, or business) as shown in FIG. 2. The system 100 may comprise one or more printed circuit boards and/or one or more integrated circuits (e.g., one or more silicon die).

The system 100 and the module 112 may be part of a local area network (LAN) and may be interconnected via a LAN technology such as Ethernet (e.g., Ethernet frames communicated over an Ethernet physical layer such as 10/100/1G/10G/40 GBASE-T). In an example implementation, each port of the system 100 and the port of module 112 that connects to system 100 may share a common subnet address that is not shared with the port of the module 112 that connects to the WAN 120. The module 112 may interface the LAN to a wide area network (WAN) 120 over broadband connection 126 utilizing, for example, DOCSIS, DSL, Carrier Ethernet, ATM, Frame Relay, ISDN, x.25, and/or other suitable WAN technology. The WAN 120 may, for example, backhaul traffic between wireless I/O module 106 and a cellular core network.

The broadcast (e.g., satellite broadcast) receive module 104 may be operable to receive broadcast signals and process the received broadcast signals to recover data (e.g., audio content, video content, and/or auxiliary data related to audio and/or video content) carried therein. Although this disclosure focuses on satellite radio and satellite television broadcast signals, the present invention is not so limited. Rather, other types of signals such as terrestrial broadcast television signals are contemplated. Accordingly, various implementations of the system 100 may comprise features described in U.S. patent application Ser. No. 13/546,704, which is incorporated herein by reference, as set forth above. In an example implementation, the receive module 104 may perform channelization such that specific channels, streams, programs, etc. from the receive module 104 can be selectively conveyed to the routing module 124. In an example implementation, the receive module 104 may output data in the form of MPEG transport stream(s) to the routing module 124. In an example implementation, the receive module 104 may encapsulate received data utilizing one or more protocols (e.g., Internet Protocol) for output to the routing module 124.

The wireless module 106 may be operable to engage in unicast and/or multicast communications with user equipment as represented by the connection 116. The wireless module 106 may be operable to engage in unicast and/or multicast communications with a service provider, as represented by connection 134. The wireless module 106 may be operable to broadcast data (e.g., media content), as represented by signal 136. The wireless module 106 may transmit and/or receive utilizing one or more wireless communication protocols such as, for example, cellular (e.g., LTE) and/or IEEE 802.11 protocols. In various example implementations, the wireless module 106 may transmit and/or receive utilizing frequency spectrum owned and/or licensed by a cellular provider, utilizing unlicensed frequency spectrum (e.g., in an Industrial, Scientific, and Medical (ISM) band) and/or utilizing dedicated frequency spectrum owned and/or licensed by the satellite provider affiliated with the satellite 102. In an example implementation, data may be communicated between the wireless module 106 and the routing module 124 in the form of MPEG transport stream (TS) packets. In an example implementation, data may be communicated between the wireless module 106 and the routing module 124 in the form of Internet Protocol (IP) packets.

In an example implementation, the wireless module 106 may comprise a timing reference module 128 which may enable the wireless module 106 to synchronize timing of its transmissions to a reference clock and/or frequency of its transmissions to a frequency reference signal. For example, the timing reference module 128 may be operable to synchronize to a reference clock and/or frequency reference signal present in received global navigation satellite system (GNSS) signals.

The wired module 108 may be operable to communicate data, via one or more cables 114, with module 112. The module 112 (e.g., a media gateway and/or edge router) may, in turn, route traffic between the system 100 and one or more other devices (e.g., client devices, such as client 122, connected to the gateway and/or interior network nodes connected to the gateway). In an example implementation, the wired I/O module 108 may be operable to output, onto the cable(s) 114, L-band signals received from the receive module 104. Such signals may be output in instances that the module 112 is a legacy gateway. Additionally or alternatively, the wired module 108 may be operable to communicate over the cable(s) 114 utilizing Ethernet, Multimedia over Coax Alliance (MoCA), and/or any other suitable protocol(s). In this manner, content may be delivered to the system 100 via the WAN 120 and broadband connection 126. Such communications may be used, for example, when the module 112 is a gateway that is compatible with an IP-LNB as described in U.S. patent application Ser. No. 13/326,125, which is incorporated by reference herein as set forth above.

In another example implementation, the module 112 may support a wireless connection and the functionality of the wired module 108 may be subsumed by the wireless module 106 and/or by a second wireless module.

The routing module 124 may be operable to selectively route data and/or signals between the modules 104, 106, and 108. The routing may be based, for example, on IP addresses, TCP/UDP port numbers, packet identifiers (PIDs), stream identifiers, and/or any other suitable field or information. For example, packets comprising a first PID (e.g., packets carrying mobile-formatted content) may be sent to the wireless module 106 and packets comprising a second PID (e.g., packets carrying high-definition content) may be sent to the wired module 108. In an example implementation, the routing module 124 may be a digital and/or analog crossbar. In an example implementation, the routing module 124 may perform an OSI layer-3 packet-routing function and/or an OSI layer-2 packet-switching function. The routing module 124 may be configured via one or more control signals (not shown) which may, in turn, be based on input (e.g., utilizing a protocol such as DiSEqC) from the module 112 and/or client devices such as the client device 122 and client device 110.

In operation of an example implementation, the broadcast receive module 104 may receive a satellite signal and perform block down conversion to generate an L-band signal. The L-band signal may be conveyed to the wired module 108 for support of legacy gateways. The receive module 104 may also demodulate the L-band signal to recover one or more MPEG transport streams, channelize the transport stream(s) to recover one or more programs, and encapsulate the transport stream(s) and/or program(s) into one or more packet streams (e.g., utilizing IP or some other suitable protocol(s)). Typically, operations such as encryption, decryption, descrambling, scrambling, etc. may be performed in end systems such as the server serving media content and the end-user device consuming the content. In some instances, however, the receive module 104 may be operable to decrypt, encrypt, descramble, and/or scramble recovered transport stream(s)/program(s) as described in U.S. patent application Ser. No. 13/316,796, which is incorporated by reference herein as set forth above. The one or more packet streams may be conveyed, via routing module 124, to the wireless module 106 and/or the wired module 108.

The wired module 108 may decapsulate, encode, modulate, encrypt, and/or otherwise process the transport stream(s) to generate signals suitable for transmission via the cable(s) 114. The wired module 108 may transmit the generated signals via the cable(s) 114. Additionally, the wired module 108 may receive signals via the cable(s) 114, decapsulate, encode, modulate, encrypt, and/or otherwise process the signals to recover content carried in the signals that may have originated from the module 112 and/or been received via the WAN 120 and the broadband connection 126. The wired module 108 may encapsulate the content into a packet stream and convey the packet stream to the routing module 124.

The wireless module 106 may encode, modulate, and/or otherwise process packet stream(s) received from the routing module 124 to generate signals suitable for broadcast by the basestation 226. Thus, the system 100 may enable broadcast of satellite data and/or data delivered to the system 100 via the WAN 120 and broadband connection 126. For the data received from the satellite 120, the system 100 may enable delivering the data to the mobile device 110 without the data having to traverse the WAN 120 or the broadband connection 126. The wireless module 106 may also convey information about the mobile device 110, and information about the data consumed by the mobile device 110, to the server 130 for purposes of billing and/or usage tracking.

Broadcasts of data by the wireless module 106 may be synchronized via, the timing reference module 128, to a received reference clock and/or frequency reference signal.

In this manner, the wireless module I/O 106 may be operable to broadcast particular data at the same time and on the same frequency band that the same data is being broadcast by other transmitters (e.g., other instances of the system 100). The system 100 along with the other transmitters may thus form a single-frequency broadcast network (SFN). As utilized herein, "single frequency" network refers to the fact that particular data may be simultaneously (or nearly so) transmitted by multiple transmitters on the same frequency. Each transmitter, however, is not limited to broadcasting on only a single frequency. Rather, each transmitter may broadcast data on multiple frequencies. Each transmitter that is part of the SFN may adhere to an electronic programming guide (EPG) that is distributed, for example, via the satellite 102 and/or the server 130. The EPG may establish which data should be broadcast on which frequency band. In an example implementation, the EPG may assign content and frequency bands on a region-by-region basis such that transmitters in a particular region each broadcast the same data on the same frequency. In this manner, to a device 110 roaming around a particular geographic region, the signals from the various transmitters in the region may simply appear, and be processed, as if they are multipath signals from a single transmitter. Different frequency bands may be utilized in different regions to, for example, account for different spectrum availability in the different regions.

FIG. 2 depicts an example implementation of the system of FIG. 1 in which the system comprises a basestation, such as, for example, a small-cell (e.g., femtocell or picocell) base station. In FIG. 2, the system 100 comprises a satellite reception assembly 202, and a gateway 214. The subassembly 204 comprises a feed horn 212, an IP-LNB module 224, a cellular basestation module 226, a routing module 230, an Ethernet transceiver module 228, and a wireless transceiver 232. The various modules of the subassembly 204 may reside in one or more housings, on one or more printed circuit boards, and/or on one or more integrated circuits (e.g., one or more silicon dice). The satellite reception assembly is not limited to implementations comprising a dish. For example, another implementation of the satellite reception assembly 204 may comprise a linear or parabolic array of antenna elements and/or receiver circuits whose signals may be combined for satellite signal reception.

In the example implementation depicted, the satellite reception assembly 202 comprises a parabolic reflector 206 and a subassembly 204 mounted (e.g., bolted or welded) to a support structure 208 which, in turn, comprises a boom 220 and attaches (e.g., via bolts) to the premises 210 (e.g., to the roof). In another example implementation, all or a portion of the modules 224, 226, 228, 230, and 232 may be mounted to the premises separate from the satellite reception assembly (e.g., connected via wired and/or wireless connections), but may still be part of the "outdoor unit." In another example implementation, all or a portion of the modules 224, 226, 228, 230, and 232 may be part of the gateway 214 (or "indoor unit").

The IP-LNB module 224 may be an implementation of the receive module 104 described above and may be as described in U.S. patent application Ser. No. 13/326,125, which is incorporated herein by reference, as set forth above. The nomenclature "IP-LNB" indicates that the module 224 possesses capabilities beyond the block downconversion of received satellite signals that is performed by conventional LNBs. Functions performed by the IP-LNB module 224 may comprise, for example, downconverting received satellite signals, demodulating received satellite signals, channelizing received satellite signals, and/or encapsulating data recovered from received satellite signals into IP packets.

The routing module 230 may be an implementation of the routing module 124 described above. Functions performed by the routing module 230 may comprise routing of data between the IP-LNB module 224, the cellular basestation module 226, and the Ethernet transceiver module 228. Although an implementation in which the routing module supports IP-based routing is described herein, any suitable protocols (e.g., Ethernet, PCIe, USB, etc.) can be utilized for communication of data between modules 224, 226, 228, 230, and 232.

The Ethernet transceiver module 228 may be an implementation of the wired module 108 described above. Functions performed by the module 228 may comprise encapsulation of data from the routing module 230 into Ethernet frames and transmission of the Ethernet frames onto the cable(s) 114 in accordance with Ethernet protocols. Additionally or alternatively, functions performed by the module 228 may comprise reception of Ethernet frames via the cable(s) 114, processing of the Ethernet frames to recover data carried therein (e.g., IP packets), and conveyance of the recovered data to the routing module 230.

The combination of the small-cell basestation module 226 and the wireless module 232 may be an implementation of the wireless module 106 described above. Functions performed by the basestation module 226 may comprise communication with cellular-enabled user-equipment (e.g., handsets, tablets, and/or laptops) that are within communication range of the basestation 226. The basestation module 226 may be operable to receive data via one or more cellular connections 116, process the received data, and output the data to the routing module 230 in the form of one or more IP packets. Similarly, the small-cell basestation 226 may be operable to receive IP packets from the routing module 230, process the IP packets, and transmit signals carrying the IP packets (or their contents) via one or more connections 116.

Functions performed by the wireless module 232 may comprise accessing the security and/or billing server 130 via the wireless connection 134 between the wireless module 106 of the system 100 and the wireless module 132 which provides wireless connectivity to the server 130. The amount of bandwidth needed for communicating billing and/or security information over the connections 116 and 134 may be small relative to the amount of bandwidth needed for the broadcast signals 136. Accordingly, in an example implementation, the module 226 may utilize, for example, $4^{th}$ generation protocols such as LTE whereas the wireless module 232 may utilize, for example, 2.5 or $3^{rd}$ generation protocols such as EDGE, HSPA, or EVDO.

The gateway 214 may be an implementation of module 112 described above. Functions performed by the gateway 214 may comprise reception, processing, and transmission of data. The gateway 214 may transmit and/or receive data to and/or from the system 100 (via cable(s) 114), the WAN 120 (via WAN connection 126), and/or one or more client devices 122 (via one or more connections 234). For data from the module 228 to a client device 122, the gateway 214 may recover the data from Ethernet frames received over the cable(s) 114 and output the data to the client device 122. For data from the client device 122 and/or gateway 114 to the module 228, the gateway 214 may encapsulate the data in one or more Ethernet frames and output the frames onto the cable(s) 114. For data between the WAN 120 and the module 228, the gateway 214 may perform OSI layer-2 switching and/or OSI layer-3 routing. Although the implementation shown in FIG. 2 uses wired connections between the gateway 214 and module 228, and between the gateway 214 and WAN 120, other may utilize wireless connections. Although the gateway 214 is depicted as separate from the system 100, in other implementations at least a portion of the system 100 may reside in and/or be implemented by the gateway 214.

In operation, the IP-LNB module 224 may process received satellite signals to recover content carried on one or more satellite channels. In an example implementation, content on one or more of the channels may be formatted for consumption by mobile devices. The content may be conveyed to the routing module 230. Additionally or alternatively, mobile-formatted content received from the gateway 214 (such content may have, for example, originated in a digital video recorder of the gateway 214 and/or been received via the WAN 120) may be conveyed to the routing module 230 via the Ethernet transceiver 228. The routing module 230 may convey the mobile-formatted content to the small-cell basestation module 226.

The system 100 may allocate the content among frequencies that are available for transmitting the content. For example, where the content comprises a plurality of television networks, each network may be broadcast on a different frequency according to an EPG provided to the system 100 (e.g., by the satellite 102 and/or by the server 103). Similarly, where the content comprises a plurality of programs, each program may be broadcast on a different frequency according to an EPG provided to the system 100.

The mobile device 110 within the coverage area of the basestation module 226 may request satellite content (e.g., a particular TV network or program) via the connection 116. In response to the request for content, the system 100 may relay information between the mobile device 110 and the server 130 to enable the server 130 to verify that the mobile device 110 is authorized to receive the requested content, and to provide information to the server 130 so that that an account associated with the mobile device 110 can be billed for the requested content and/or for the bandwidth utilized in receiving the content. The system 100 may communicate with the server 130 via the connection 134. Additionally or alternatively, the system 100 may communicate with the server 130 via the module 228, cable 114, gateway 214, and WAN 120.

Upon the server 130 determining that the mobile device 110 is authorized to receive the content that it is requesting, decryption/descrambling keys, an EPG, and/or other information necessary for receiving the requested content may be transmitted to the device 110 via connections 134 and 116. The mobile device 110 may then tune to the frequency of the desired content, receive the broadcast content, descramble and/or decrypt the received content, and present the content to its user.

In this manner, for satellite content received via the IP-LNB 224, such satellite content may be delivered to the mobile device 110 without the content having to traverse the WAN 120 or the connection 126. Thus, in instances that the system 100 communicates with the server 130 via connection 126 and WAN 120, satellite content may be delivered to the mobile device 110 while only adding a small amount of billing and/or security traffic to the WAN 120. Moreover, in instances that the system 100 communicates with the server 130 via connection 134, satellite content may be delivered to mobile device 110 without putting any load on the connection 126 or WAN 120, thus enabling delivery of the satellite content even when the broadband connection 126 and/or WAN 120 are unavailable.

In an example implementation, the mobile device 110 may belong to a first satellite subscriber and the satellite reception assembly 302 may be installed at the home of a second satellite subscriber. Thus, aspects of the present disclosure may enable the first subscriber to receive satellite content to which he has subscribed via another subscriber's satellite reception assembly.

FIG. 3 depicts an example implementation of the system of FIG. 1 in which the system comprises a basestation such as, for example, a macrocell basestation. In FIG. 3, the system 100 includes a basestation 306 and a satellite reception assembly 302 that, in turn, comprises a subassembly 304. In the example implementation shown in FIG. 3, the combination of the wireless module 232 and the basestation 306 may be an implementation of the wireless module 106 described above. Similarly, for example, the routing module 330 may be an implementation of the routing module 124 described above, the wireless transceiver 232 may be as described above, the module 228 may be as described above, and the module 112 may be as described above. The routing module 330 may be operable to selectively route data and/or signals between the modules 224, 232, 228, and the basestation 306.

Operation may be substantially similar to operation of the implementation described with respect to FIG. 2.

Figure 4A:
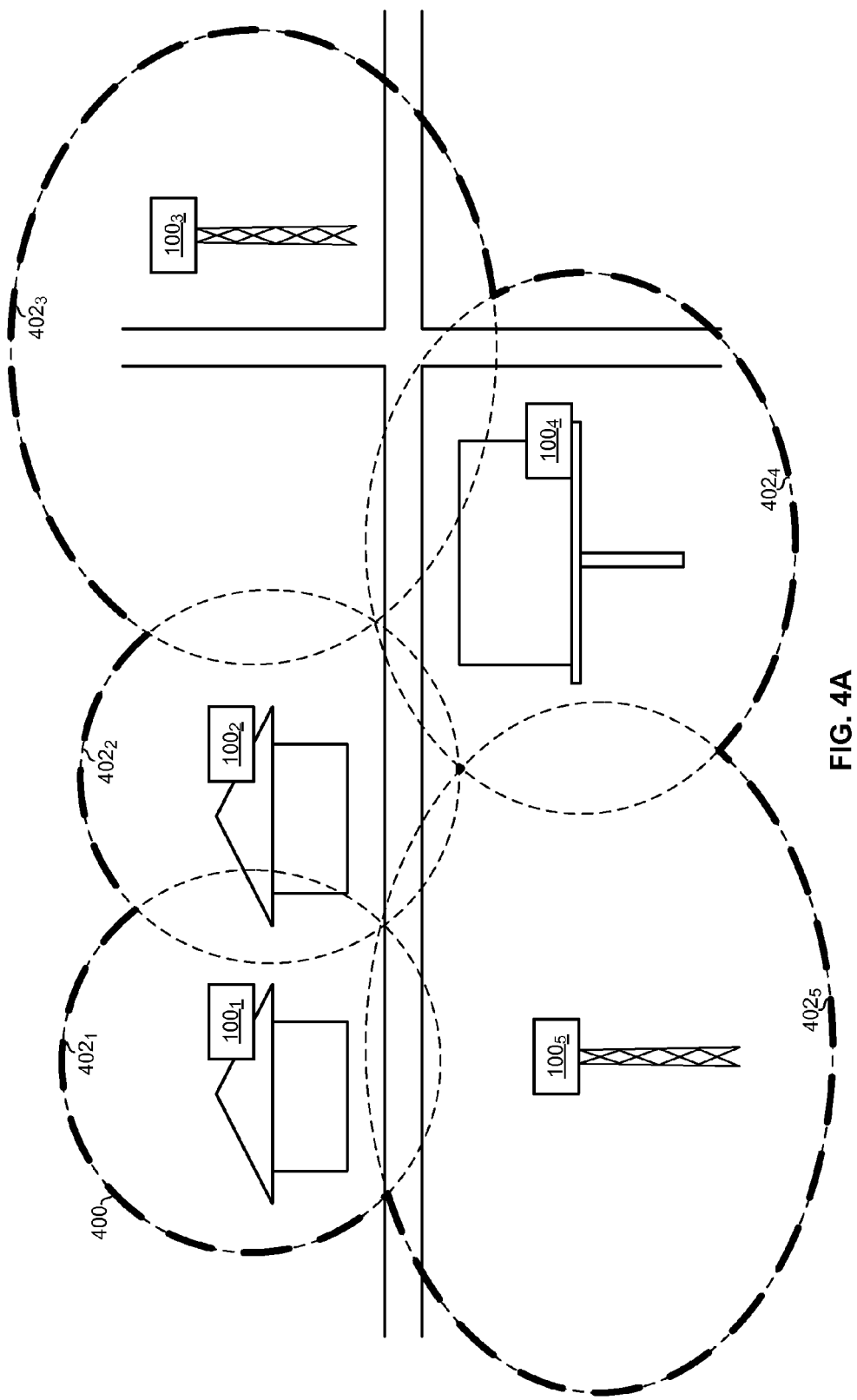
FIG. 4A is a diagram depicting a region of a single frequency network for broadcasting to mobile devices.

FIG. 4A is a diagram depicting a region of a single frequency network for broadcasting to mobile devices. The region 400 (indicated by the heavy dashed line) comprises coverage areas $402_1$-$402_5$ (indicated by the thin dashed lines), each of which is associated with an instance of the system 100. For simplicity of illustration, it is assumed the coverage area for two-way communications (e.g., connection 116) is the same as the broadcast coverage area (e.g., the reach of signals 136), but the invention is not so limited. The systems $100_1$-$100_5$ may reside in various locations such as on subscriber homes, on cellular towers, on roadside signs, etc. Although the region shown in FIG. 4A comprises five instances of the system 100, a region is not restricted to any particular number of instances of the systems 100.

Each of the systems $100_1$-$100_5$ may be synchronized to a reference clock (e.g., a GNSS clock) and may be locked to a frequency reference signal (e.g., a GNSS signal or any other signal available to each of the systems $100_1$-$100_5$). Additionally, each of the systems $100_1$-$100_5$ may broadcast data (e.g., media content) according to an EPG. The EPG may designate each of the systems $100_1$-$100_5$ as belonging to region 400 and may designate which content (e.g., programs and/or TV networks) is to be transmitted on which frequency bands in region 400. Accordingly, each of the systems $100_1$-$100_5$ may simultaneously (or as nearly so as possible given tolerances of components) broadcast a particular program on a particular frequency band. The device 110, therefore, may roam throughout the region 400 while receiving the particular program on the particular frequency without regard to which of the systems $100_1$-$100_5$ the program is being received from any given time instant. When the device 110 is in a location where coverage areas overlap, the signals may simply appear as multipath from a single source and may be processed as such.

Figure 4B:
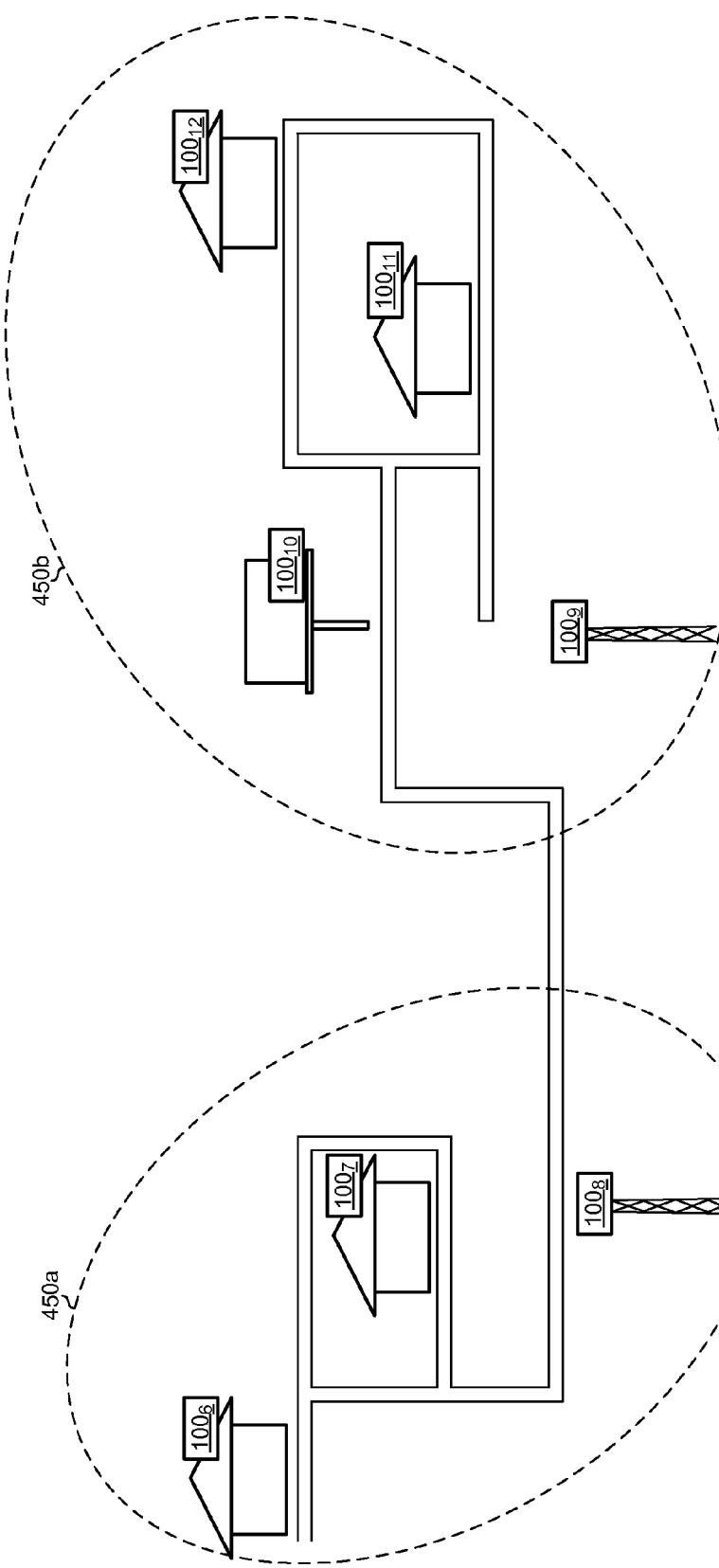
FIG. 4B is a diagram depicting multiple regions of a single frequency network for broadcasting to mobile devices.

FIG. 4B is a diagram depicting multiple regions of a single frequency network for broadcasting to mobile devices. Shown are regions 450a and 450b, each of which may be substantially similar to the region 400 described with reference to FIG. 4A. The region 450a comprises systems $100_6$-$100_8$ each of which may be synchronized to a reference clock and which may be phase and/or frequency locked to a reference signal. Similarly, the region 450b comprises systems $100_9$-$100_{12}$ each of which may be synchronized to a reference clock and phase and/or frequency locked to a reference signal. In some instances, the reference clock utilized in the region 450a may be the same as the reference clock utilized in the region 450b. In other instances, the reference clock utilized in region 450a may be a different clock than the reference clock utilized in the region 450b. In some instances, the reference signal utilized in the region 450a may be the same as the reference signal utilized in the region 450b. In other instances, the reference signal utilized in region 450a may be a different signal than the reference signal utilized in the region 450b.

In an exemplary implementation, an EPG distributed to each of the systems $100_6$-$100_{12}$ may instruct the systems $100_6$-$100_8$ in region 450a to transmit first content (e.g., a first set of programs and/or TV networks) on a first one or more frequency bands and instruct the systems $100_9$-$100_{12}$ in the region 450b to transmit second content (e.g., a second set of programs and/or TV networks) on a second one or more frequency bands. In instances where the same frequency bands are available the first set of frequency bands may be the same as the second set of frequency bands, otherwise the first set may comprise one or more frequency bands not in the second set and/or vice versa. Which content is transmitted in each of the regions 450a and 450b may be determined, for example, based on subscriber preferences in the regions, based on local television networks available in those regions, based content popularity in the regions, based on advertisers targeting one or both of the regions, etc.

Figure 5:
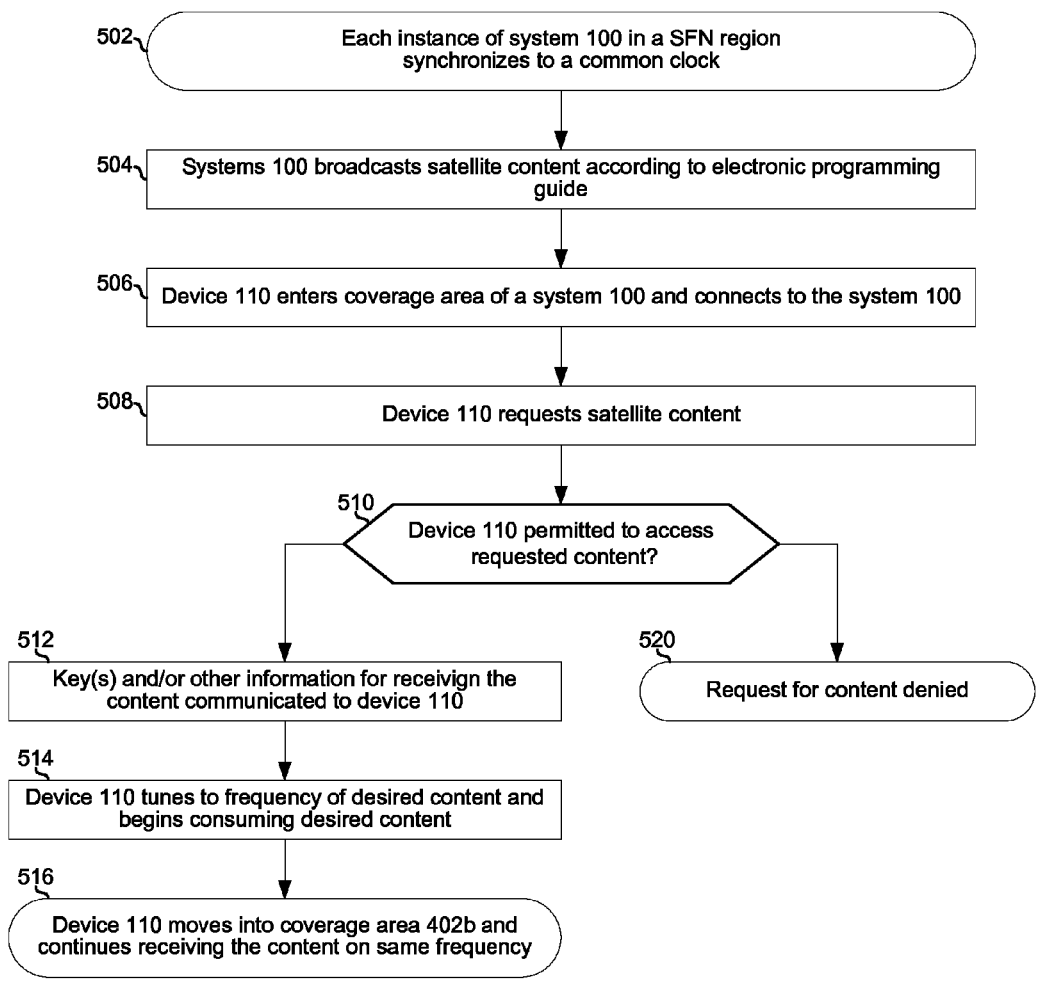
FIG. 5 is a flowchart illustrating example steps for delivering data to mobile devices via a single frequency network.

FIG. 5 is a flowchart illustrating example steps for delivering data to mobile devices via a single frequency network. The steps begin with step 502 in which each of the systems 100 in each of the regions of the SFN synchronize to a reference clock and phase and/or frequency lock to a reference signal designated for use (e.g., by a satellite provider) in their respective regions. In step 504, the systems 100 begin broadcasting content according to an EPG. In step 506, a mobile device 110 enters the coverage area of a system 100 that is part of a SFN region (e.g., the coverage area $402_1$ of the system $100_1$ in FIG. 4B) and connects to the system 100 (e.g., establishes a connection 116). In step 508, the device 110 requests access to content being broadcast by the system 100. In step 510, it is determined whether the device 110 is authorized to access the content (e.g., determined whether the device 110 has an active subscription). Such a determination may, for example, be made by the server 130 using information received from the device 110 via the system 100 and/or via another network path (e.g., cellular connection) not involving the system 100. The determination of whether the mobile device 110 is authorized may be communicated from the server 130 to the system 100 to instruct the system 100 as to whether to deliver the content or not. Accordingly, if the server 130 informs the system 100 that the device 110 is not authorized to access the content, then in step 520 the request is denied.

Returning to step 510, if the device 110 is authorized to access the content, then, in step 512, descrambling/decryption keys and/or other information for receiving the content (e.g., information about the frequency band on which the content is being broadcast) are communicated to the device 110 from the server 130 via a network path which may or may not include the system 100. In step 514, the device tunes to the frequency band that is carrying the desired content, receives and decrypts/descrambles the content, and presents the content to its user. In step 516, the device roams into a different coverage area of the same region. Reception of the content is unaffected by this movement since the system 100 associated with the new coverage area transmitting the same content at the same time on the same frequency.

Figure 6:
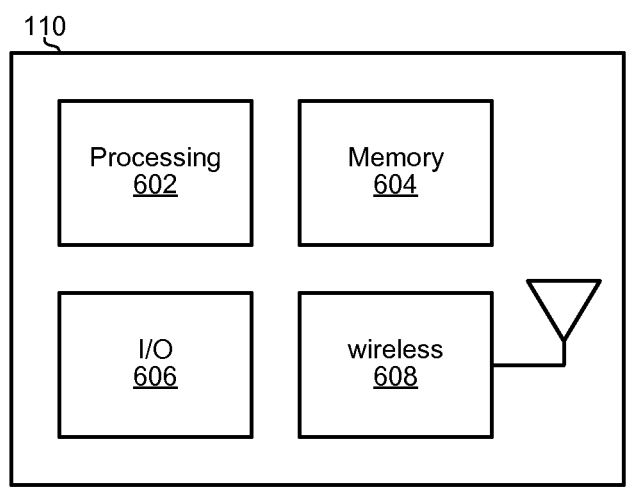
FIG. 6 is a block diagram of an example mobile device operable to receive data broadcast on a single frequency network.

FIG. 6 is a block diagram of an example mobile device operable to receive data broadcast on a single frequency network. Shown is an example implementation of the mobile device 110 that comprises a processing module 602, a memory module 604, an input/output module 606, and a wireless module 608.

The processing module 602 may be operable to execute lines of code (e.g., code corresponding to an operating system and/or one or more applications programs) to effect operation of the electronic device 100. Such operation may include receiving broadcast content via the wireless module 608, processing the received content, and presenting the content to a user via the I/O module 608.

The memory module 604 may comprise volatile and/or non-volatile memory which stores, for example, general data, configuration parameters, program code, and/or run-time data generated by the processing module 602 while executing program code. In an example embodiment, the memory module 604 may be distributed among various components of the device 100 and may be utilized for mass storage and/or buffering of content.

The input/output (I/O) module 120 may enable a user to interact with the electronic device 100. In this regard, the I/O module 120 may support various types of inputs and/or outputs, including video, audio, and/or text. I/O devices and/or components, external or internal, may be utilized for inputting and/or outputting data during operations of the I/O module 120. The I/O module 120 may comprise, for example, control(s) (e.g., hard buttons and/or a touchscreen), a microphone, and speaker(s).

The wireless module 102 may implement one or more layers of one or more wireless protocol stacks to enable communication over a connection such as the connection 116 and to receive broadcast content from a system 100. The wireless module 102 may, for example, perform packetization, de-packetization, encoding, decoding, encrypting, decrypting, modulation, demodulation, upconversion, downconversion, etc.

In an example implementation, the wireless module 102 may be operable to communicate on multiple frequency bands. For example, the connection 116 may be on a first one or more frequency bands but broadcast content from a system 100 may be on a second one or more frequency bands.

In an example implementation, the wireless module 102 may be operable to communicate on frequency bands licensed by disparate service providers. For example, the connection 116 may be on one or more first frequency bands and in adherence with protocols used by a first service provider (e.g., a cellular provider) and broadcast content may be received from a system 100 on one or more second frequency bands and in adherence with protocols used by a second service provider (e.g., a satellite service provider).

Figure 7:
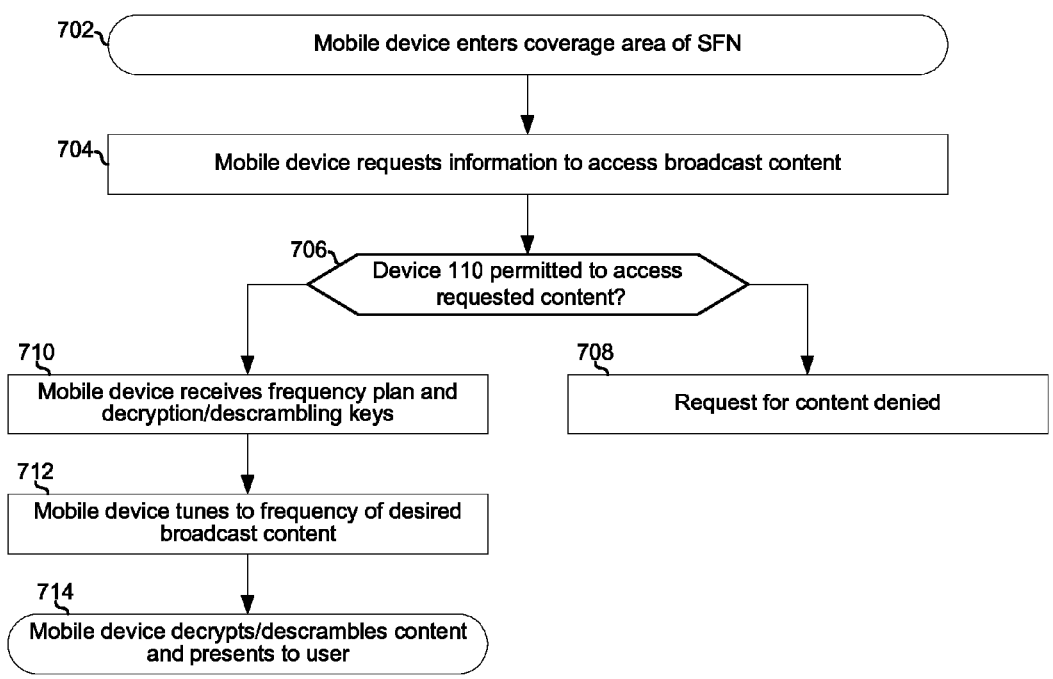
FIG. 7 is a flowchart illustrating example steps for delivery of content to a mobile device via a single frequency network.

FIG. 7 is a flowchart illustrating example steps for delivery of content to a mobile device via a single frequency network. The example steps begin with step 702 in which the mobile device 110 enters a broadcast coverage region 400. In step 704, the mobile device requests access to content broadcast by the systems $100_1$-$100_5$. In step 706, it is determined (e.g., by server 130) whether the device 110 is authorized to access the requested content (e.g., determined whether the device 110 has an active subscription). If the device 110 is not authorized to access the requested content, then in step 520 the mobile device 110 receives a denial of its request.

Returning to step 706, if the device 110 is authorized to receive the requested broadcast content, then, in step 710, descrambling/decryption keys and/or other information for receiving the content (e.g., information about the frequency band on which the content is being broadcast) are received by the device 110 (e.g., from the server 130 via the system 100 and/or from the server via another connection not involving the system 100). In step 712, the mobile device tunes the wireless module 608 to the frequency band of the requested content, as determined based on the information received in step 710. In step 714, the wireless module 608 receives the broadcast content, processes, and presents it to a user via the I/O module 606.

Figure 8:
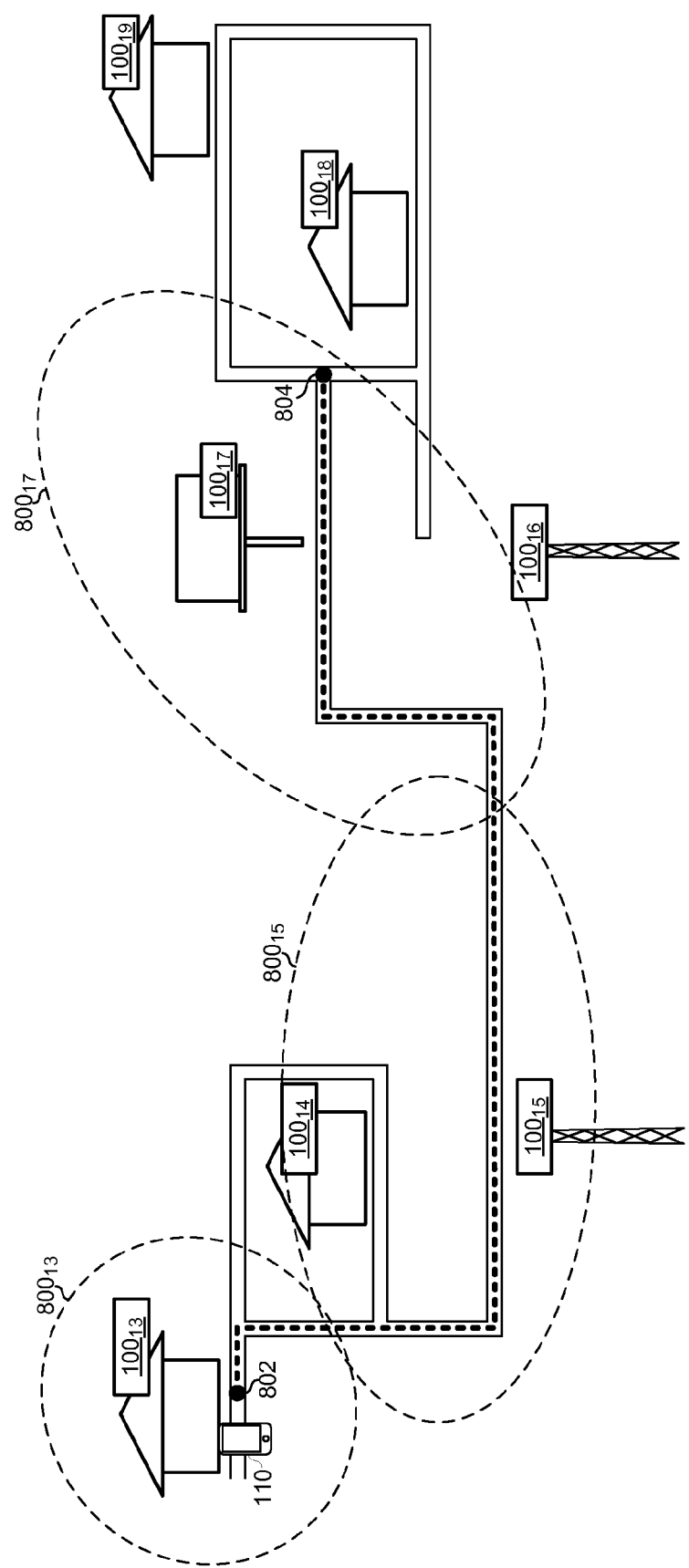
FIG. 8 depicts a plurality of satellite reception assemblies that are operable to participate in a single frequency network.

FIG. 8 depicts a plurality of satellite reception assemblies that are operable to participate in a single frequency network. Shown are satellite reception assemblies $100_{13}$-$100_{19}$, and a mobile device 110 making a trip from location 802 to location 804. Also shown are coverage areas $800_6$, $800_{15}$, and $800_{17}$ corresponding, respectively, to satellite reception assemblies $100_{13}$, $100_{15}$, and $100_{17}$. The mobile device 110 may desire to receive particular content as it makes the trip from 802 to 804.

In an example implementation, the particular content may be selected from a list of particular content that is available and is already scheduled to be transmitted be each of the assemblies $100_{13}$-$100_{19}$ during the trip. In such an implementation, the mobile device 110 may, after being validated, receive keys for decrypting the broadcast content and then, during the trip, tune to the broadcast content similar to the manner in which a television or set-top-box may tune to a conventional cable or satellite television channel.

In another example implementation, the particular content may not be scheduled for broadcast by all satellite reception assemblies $100_{13}$-$100_{19}$. Rather, at any given time, the particular content may be broadcast only by the satellite reception assembly $100_i$ (i being an integer between 13 and 19) corresponding to the coverage area 800, that the mobile device 110 is in at that time. The assemblies $100_{13}$-$100_{19}$ (and/or a network management entity that coordinates the assemblies $100_{13}$-$100_{19}$) may determine which coverage area the mobile device 110 is in based on two-way communications between the mobile device 110 and the module 106 of the satellite reception assembly $100_i$. Alternatively, which coverage area the mobile device 110 is in may be determined based on information communicated from the mobile 110 to the assemblies $100_{13}$-$100_{19}$ (and/or an SFN management entity) via a cellular link to a conventional basestation and a backhaul network. In this manner, efficient use of resources in the assemblies $100_{13}$-$100_{19}$ may be achieved. For example, where the device 110 is in coverage area $800_{13}$ and is the only device desiring the particular content, the assembly $100_{13}$ may broadcast the particular content but other assemblies $100_{14}$-$100_{19}$ may not (thus freeing up resources in assemblies $100_{14}$-$100_{19}$ for broadcasting content that is actually desired in their respective coverage areas).

Information which may be communicated from the device 110 to the SFN and may be used for determining which satellite reception assembly broadcasts which content at which times may include, for example, GNSS coordinates of the mobile device 110, a velocity of the mobile device 110, and/or a planned route of the mobile device 110 (e.g., uploaded to the backhaul network upon being calculated by a map application of the mobile device 110). By using such information, movement of the device 110 from one coverage area to another may be predicted such that the mobile device 110 may receive the content seamlessly.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for a single frequency network for broadcasting to mobile devices.

Accordingly, the present method and/or system may be realized in hardware, software, or a combination of hardware and software. The present method and/or system may be realized in a centralized fashion in at least one computing system, or in a distributed fashion where different elements are spread across several interconnected computing systems. Any kind of computing system or other system adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:
    a first satellite reception assembly that is operable to receive a satellite signal, recover content carried in said satellite signal, and broadcast said content for reception by one or more mobile devices in a first coverage area; and
    a second satellite reception assembly that is operable to receive said satellite signal, recover said content carried in said satellite signal, and broadcast said content for reception by one or more mobile devices in a second coverage area, wherein:
        said broadcast of said content by said second satellite reception assembly is on the same frequency band as said broadcast of said content by said first satellite reception assembly;
        at least part of said first coverage area overlaps, during one or more time instants, with at least part of said second coverage area.

2. The system of claim 1, wherein said broadcast of said content by said second satellite reception assembly is synchronous with said broadcast of said content by said first satellite reception assembly.

3. The system of claim 1, wherein each of said first satellite reception assembly and said second satellite reception assembly comprises circuitry that is operable to frequency lock to a received reference signal.

4. The system of claim 3 wherein said reference signal is a GNSS signal.

5. The system of claim 1, wherein each of said first satellite reception assembly and said second satellite reception assembly comprises circuitry that is operable to synchronize a received reference clock.

6. The system of claim 5 wherein said reference clock is a GNSS clock.

7. The system of claim 1, wherein said first satellite reception assembly is mounted to the residence of a first satellite subscriber and said second satellite reception is mounted to the residence of a second satellite subscriber.

* * * * *